United States Patent Office

3,639,479
Patented Feb. 1, 1972

3,639,479
PROCESS FOR THE PREPARATION OF 2-CHLORO-ALKYL ISOCYANIDE DICHLORIDES IN ADDITION TO DICHLOROALKANES
Dieter Arlt, Cologne-Buccheim, Germany, assignor to Farbenfabriken Bayer Aktiengesellschaft, Leverkusen, Germany
No Drawing. Filed Mar. 7, 1968, Ser. No. 711,219
Claims priority, application Germany, Apr. 7, 1967, F 52,056
Int. Cl. C07c *119/00*
U.S. Cl. 260—566 D     5 Claims

ABSTRACT OF THE DISCLOSURE

Production of 2-chloroalkyl-isocyanide dichlorides having the formula

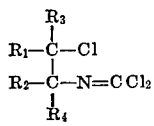

in which $R_1$ to $R_4$ each individually is a radical selected from the group consisting of hydrogen, alkyl, alkenyl, cycloalkenyl, aryl, with the proviso that two of such radicals when taken together with the

group form a member selected from the group consisting of an alicyclic ring moiety containing said

group and such alicyclic ring moiety containing both said

group and an —$SO_2$— group, and such $R_1$ to $R_4$ members which are substituted with substituents selected from the group consisting of $NO_2$, halo —N=$CCl_2$ and alkoxy, in addition to dichloroalkanes, which comprises reacting an olefin having the formula

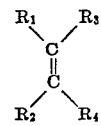

in which $R_1$ to $R_4$ each individually is a radical selected from the group consisting of hydrogen, alkyl, alkenyl, cycloalkenyl, aryl, with the proviso that two of such radicals when taken together with the >C=C< group form a member selected from the group consisting of an alicyclic ring moiety containing said >C=C< group and such alicyclic ring moiety containing both said >C=C< group and an —$SO_2$— group, and such $R_1$ to $R_4$ members which are substituted with substituents selected from the group consisting of $NO_2$, halo —N=$CCl_2$ and alkoxy, with at most that quantity of a chlorinating agent selected from the group consisting of chlorine and sulfuryl chloride which is required for satisfying one olefinic double bond and with at least the stoichiometrically necessary quantity of cyanogen chloride at a temperature substantially between about —30 to +50° C., whereby to form the corresponding 2-chloroalkyl-isocyanide dichloride; the reaction optionally being carried out at elevated pressure and/or in the presence of an inert organic solvent; such compounds being novel when at least one of the radicals $R_1$ to $R_4$ does not represent hydrogen; and all of said compounds being usable as intermediates for preparing plastics auxiliaries, or directly for preparing isocyanates and in turn by conversion of such isocyanates with amines for preparing ureas in known manner, or as plant protection agents per se.

---

This invention relates to a process for the preparation of 2-chloroalkyl isocyanide dichlorides in addition to dichloroalkanes.

We have found that mostly new 2-chloroalkylisocyanide dichlorides, in addition to dichloroalkanes, can be obtained by reacting an olefin of the general formula

    (I)

in which $R_1$ to $R_4$ are similar or different radicals such as hydrogen, an optionally substituted saturated or unsaturated alkyl or cycloalkyl radical or an optionally substituted aromatic radical, in addition to which $R_1$ and $R_2$ together may also form a constituent of an alicyclic ring system optionally containing a double bond in which a methylene group may optionally be replaced by $SO_2$, or an aromatic ring system, with at the most that quantity of chlorine or sulphuryl chloride which is required for one olefinic double bond and with at least the stoichiometrically necessary quantity of cyanogen chloride at a temperature in the range of from about —30° C. to about 50° C. and optionally at elevated pressure.

The compounds that can be obtained by the process according to the invention correspond to the general formula:

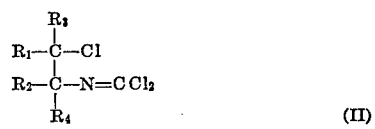    (II)

in which the radicals $R_1$ to $R_4$ are as defined above. They may be regarded as novel compounds providing at least one of the radicals $R_1$ to $R_4$ does not represent hydrogen.

Linear or branched alkyl radicals with 1 to 20, and preferably with 1 to 6 carbon atoms which may optionally contain further double bonds, preferably one or two, e.g. alkenyl, are mentioned as examples of optionally substituted aliphatic radicals.

Suitable cycloaliphatic radicals include those with 5 to 12, and preferably with from 5 to 6, carbon atoms in the ring system which may optionally contain another double bond.

The following are mentioned as examples of substituents on the aliphatic or cycloaliphatic radical: $NO_2$, halogens (preferably fluorine, chlorine, bromine), —N=$CCl_2$ and alkoxy (preferably 1 to 4 carbon atoms).

As a rule, the sum total of carbon atoms in the radicals $R_1$ to $R_4$ does not amount to more than 20. Preferred, optionally substituted aromatic radicals include those with up to 10 carbon atoms in the ring system, in which case generally no more than two of the radicals $R_1$ to $R_4$ represent an aromatic radical. $NO_2$, halogens (preferably fluorine, chlorine, bromine), —N=$CCl_2$ or alkoxy (preferably 1 to 4 carbon atoms) are mentioned as examples of substituents on the aromatic radical.

The following are mentioned as examples of suitable starting compounds: linear or branched alkenes with from 2 to 20 carbon atoms such as ethylene, propylene, isobutylene, 2-methyl-2-butene, diisobutylene, isononylene, isododecylene, 1-dodecene, 1-hexadecene and 1-octadecene; also cyclopentene, butadiene sulphone, cyclohexene and cyclododecene; aryl-alkenes such as styrene and α-methyl styrene; acyclic and cyclic dienes and trienes such as 1,3-butadiene, isoprene, cyclopentadiene, vinylcyclohexene, 1,5-octadiene and cyclododecatriene; olefinic compounds with additional functional groups such as allyl chloride, methallyl chloride and nuclear-substituted sytrenes are also suitable.

As a rule, it is of advantage to use chlorine or sulphuryl chloride and olefin in a molar ratio of about 1:1 and cyanogen chloride in excess. In some cases, it may be of advantage to use an olefin in more than the stoichiometrically necessary quantity in order to avoid an excess of chlorine and then to recover the excess if required. This also applies in particular when repeatedly unsaturated olefins are used in order to yield unsaturated isocyanide dichlorides.

The process according to the invention is also carried out in the presence of an inert organic solvent, such as, for example, methylene chloride, chloroform, carbon tetrachloride or chlorobenzene. In a preferred embodiment of the process according to the invention, excess cyanogen chloride is used as the solvent.

The reaction is generally carried out in the temperature range of from −30° C. to about 50° C., and preferably in the range of from about −6° C. to about 10° C.

The reaction mixtures are worked up in the usual way by distillation.

It must be regarded as extremely surprising that novel 2-chloroalkyl isocyanide dichlorides can be obtained by the process according to the invention because it is known that cyanogen chloride is trimerised by the action of chlorine (Liebig Annalen der Chemie, 79, page 285; Liebig Annalen der Chemie, 155, page 175).

The new isocyanide dichlorides are valuable intermediate products for the preparation of plastics auxiliaries. However, they may also be directly used for the production of isocyanates. For example, 107 g. (=0.5 mol) of 2-chlorocyclohexyl isocyanide dichloride are dissolved in 200 ml. of dichlorobenzene. 48 g. (=0.5 mol) of methane sulphonic acid are then added dropwise with stirring at 20° C., hydrogen chloride being given off as the temperature of the reaction mixture rises. The mixture is then heated for 15 minutes to 150° C., after which it is subjected to fractional distillation in vacuo. 66 g. (82% of the theoretical) of 2-chlorocyclohexyl isocyanate boiling at 94–97° C./13 torr are obtained.

The other isocyanide dichlorides may be similarly used for the production of isocyanates. In addition, the isocyanates thus prepared may be converted with amines into ureas in known manner. The isocyanide dichlorides prepared by the process according to the invention may also be directly used as plant protection agents.

The invention is illustrated by the following examples.

EXAMPLE 1

315 g. of chlorine (4.45 mols) and 190 g. (4.5 mols) of propylene are introduced over a period of some 6 hours into a stream of cyanogen chloride in a cooled reaction tube. During the reaction, the reaction mixture is kept at a temperature of approximately 0° C. by cooling. It flows into a distillation flask from which the excess cyanogen chloride is continuously distilled off and recycle to the reaction tube. Fractional distillation of the tail product gives 210 g., or 41% of the theoretical, based on the chlorine used, of chloroisopropylisocyanide dichloride of B.P. 63° C./15 torr and 300 g. of dichloropropane.

Analysis.—$C_4H_6NCl_3$ (molecular weight 174.5): Calculated (percent): C, 27.5; H, 3.5; N, 8.0; Cl, 61.0. Found (percent): C, 27.7; H, 3.7; N, 7.9; Cl, 61.0.

EXAMPLE 2

164 g. of cyclohexene and 145 g. of chlorine are simultaneously reacted for 6 hours at 10° C. in 600 g. of cyanogen chloride, the reaction mixture being stirred and cooled throughout the reaction. The excess cyanogen chloride is distilled off at normal pressure, and the residual reaction product is subjected to fractional distillation in vacuo. Trans-2-chlorocyclohexyl isocyanie dichloride of B.P. 85° C./0.7 torr is obtained in a yield of 200 g. or 47% of the theoretical, based on the cyclohexene used, in addition to dichlorocyclohexane.

Analysis.—$C_7H_{10}NCl_3$ (molecular weight 214.5): Calculated (percent): C, 39.2; H, 4.7; N, 6.5; Cl, 49.6. Found (percent): C, 39.5; H, 4.7; N, 6.3; Cl, 49.9.

EXAMPLE 3

71 g. of chlorine and 35 g. of ethylene are introduced with stirring over a period of 4 hours into 600 g. of cyanogen chloride cooled to 0° C. The reaction mixture is then distilled, initially at normal pressure, until the boiling point of the distillate reaches 84° C. Subsequent distillation in vacuo gives 34 g. (or 21% of the theoretical, based on the chlorine used) of 2-chloroethylisocyanide dichloride of B.P. 63–64° C./23 torr, and 1,2-dichloroethane.

Analysis.—$C_3H_4NCl_3$ (molecular weight 160.4): Calculated (percent): C, 22.5; H, 2.5; N, 8.7; Cl, 66.3. Found (percent): C, 23.2; H, 2.8; N, 8.8; Cl, 65.9.

EXAMPLE 4

71 g. of chlorine and 120 g. of butadiene are introduced over a period of 4 hours into cyanogen chloride cooled to 0° C. flowing through the reaction tube. The reaction mixture flows into a distillation flask from which the excess cyanogen chloride is continuously distilled off and recycled to the reaction tube. Fractional distillation of the tail product gives, in addition to dichlorobutenes, 49 g. (or 26% of the theoretical based on the chlorine used) of 1-chloromethylallyl isocyanide dichloride (a) boiling at 65–66° C./12 torr, and 78 g. (or 42% of the theoretical, based on the chlorine used) of 4-chloro-2-butenyl isocyanide dichloride (b) boiling at 96–97° C./12 torr.

Analysis.—$C_5H_6NCl_3$ (molecular weight 186.5): Calculated (percent): C, 32.2; H, 3.2; N, 7.5; Cl, 57.0. Found (percent): (a) C, 33.1; H, 3.5; N, 6.9; Cl, 57.7. Found (percent): (b) C, 32.1; H, 3.4; N, 7.3; Cl, 57.8.

EXAMPLE 5

136 g. of sulphuryl chloride and 82 g. of cyclohexene are added dropwise at 0° C. to 150 g. of cyanogen chloride over a period of 1 hour during which the reaction mixture is stirred and cooled. The excess cyanogen chloride is then distilled off at normal pressure. The residual reaction mixture is subjected to fractional distillation in vacuo. 39 g. of dichlorocyclohexane and 108 g. (=50% of the theoretical) of trans-2-chlorocyclohexyl isocyanide dichloride boiling at 85–88° C./0.8 torr are obtained.

The IR and KMR-spectra are identical with those of the compound prepared in accordance with Example 2.

What we claim is:

1. Process for the production of 2-chloroalkylisocyanide dichlorides in addition to dichloroalkanes, which comprises reacting an olefin having the formula

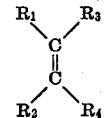

in which $R_1$ to $R_4$ each individually is selected from the group of
hydrogen
alkyl containing 1 to 6 carbon atoms;
cyclopentyl;
cyclohexyl;
cyclohexenyl;
aryl containing up to 10 carbon atoms;

$R_1$ and $R_2$ together with the $>C=C<$ group forming an unsubstituted alicyclic ring or an unsubstituted ring containing an $-SO_2-$ group;

the foregoing substituted with a radical from the group of $-NO_2$, halo, $-N=CCl_2$ and alkoxy containing 1 to 4 carbon atoms;

no more than 2 of $R_1$ to $R_4$ being aryl; and the sum total of carbon atoms in $R_1$ to $R_4$ not amounting to more than 20, with at most that quantity of a chlorinating agent selected from the group consisting of chlorine and sulfuryl chloride which is required for satisfying one olefinic double bond and with at least the stoichiometrically necessary quantity of cyanogen chloride at a temperature substantially between about $-30$ to $+50°$ C.

2. Process according to claim 1 wherein the reaction is carried out at elevated pressure.

3. Process according to claim 1 wherein the reaction is carried out in the presence of an inert organic solvent.

4. Process according to claim 1 wherein said olefin is selected from the group consisting of ethylene, propylene, isobutylene, 2-methyl-2-butene, diisobutylene, isononylene, isododecylene, 1-dodecene, 1-hexadecene, 1-octadecene, cyclopentene, butadiene sulfone, cyclohexene, cyclododecene, styrene, α-methyl styrene, 1,3-butadiene, isoprene, cyclopentadiene, vinylcyclohexene, 1,5-octadiene, cyclododecatriene, allyl chloride and methallyl chloride.

5. Process according to claim 1 wherein $R_1$ to $R_4$ each individually is a radical selected from the group consisting of hydrogen, alkyl having 1–6 carbon atoms and alkenyl having 1–6 carbon atoms, with the proviso that $R_1$ and $R_2$ when taken together with the $>C=C<$ group form a corresponding cyclyohexenyl moiety.

References Cited

FOREIGN PATENTS 952,805   1964   Great Britain _____ 260—566

LEON ZITVER, Primary Examiner

G. A. SCHWARTZ, Assistant Examiner

U.S. Cl. X.R.

260—327 R, 332.1, 453 P, 659 R, 660, 999

PO-1050
(5/69)

UNITED STATES PATENT OFFICE
CERTIFICATE OF CORRECTION

Patent No. 3,639,479          Dated February 1, 1972

Inventor(s) Dieter Arlt

It is certified that error appears in the above-identified patent and that said Letters Patent are hereby corrected as shown below:

Col. 1, lines 26 and 27 of the Abstract,

Delete "two of such" and substitute -- $R^1$ and $R^2$ --

Col. 4, line 5,

"isocyanie" should read -- isocyanide --

Signed and sealed this 13th day of June 1972.

(SEAL)
Attest:

EDWARD M. FLETCHER, JR.          ROBERT GOTTSCHALK
Attesting Officer                Commissioner of Patents